United States Patent
Watanabe

(10) Patent No.: US 6,396,498 B1
(45) Date of Patent: *May 28, 2002

(54) INFORMATION PROCESSING APPARATUS AND METHOD, AND PROVIDING MEDIUM

(75) Inventor: Ryuichi Watanabe, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,653

(22) Filed: May 19, 1999

(30) Foreign Application Priority Data

May 21, 1998 (JP) ............................................ 10-139270
Nov. 11, 1998 (JP) ............................................ 10-320328

(51) Int. Cl.⁷ ............................................... G06T 11/20
(52) U.S. Cl. ........................................ 345/443; 701/201
(58) Field of Search ............................ 345/443; 701/201

(56) References Cited

U.S. PATENT DOCUMENTS 5,874,905 A * 2/1999 Nanba et al. ................. 340/995
5,908,465 A * 6/1999 Ito et al. ...................... 701/211
6,061,003 A * 5/2000 Harada ......................... 340/995
6,144,318 A * 11/2000 Hayashi et al. .............. 340/995

OTHER PUBLICATIONS

U.S. Application No. 09/084,687, filed May 26, 1998.
U.S. Application No. 09/088,235, filed Jun. 1, 1998.
U.S. Application No. 09/087,703, filed Jun. 1, 1998.

* cited by examiner

Primary Examiner—Michael Razavi
Assistant Examiner—Motilewa Good-Johnson
(74) Attorney, Agent, or Firm—Oblon, Spivak, McClelland, Maier & Neustadt, P.C.

(57) ABSTRACT

There is provided an information processing apparatus in which when a route to a destination is searched, a road of the route is displayed with emphasis while a color or shape indicating the type of the road can be checked. When the route to the destination is searched, both sides of the road of the searched route are displayed with emphasis lines. The inside of both the sides of the road is displayed such that the type of the road, such as an expressway or an open load, can be recognized. By this, a user can easily check the searched route, and can check the type of the road of the route. For example, in the route from a current location to a destination, the user can check that a route A is an expressway, and other route B, route C, and route D are open roads.

12 Claims, 11 Drawing Sheets

INFORMATION PROCESSING APPARATUS AND METHOD, AND PROVIDING MEDIUM

BACKGROUND OF THE INVENTION

1. Field of the Invention

The present invention relates to an information processing apparatus, an information processing method, and a providing medium, and particularly to an information processing apparatus, an information processing method, and a providing medium, which can display a designated road with emphasis while preventing such a state that it becomes hard for a user to recognize the type of road.

2. Description of the Related Art

FIG. 1 shows a display example of a map image drawn through a car navigation program made to start on a personal computer or a car navigation apparatus. In this example, a current location and a destination are displayed, and further, various roads are displayed in designated modes. For example, an expressway is displayed in white, and an open road is displayed in black. A road in a tunnel is displayed with a dotted line. Like this, since various roads are drawn in the designated modes and are displayed, a user can recognize the type of the road (for example, an expressway, an open road, or a road in a tunnel) by checking the display.

When a route (road) from the current location to the destination is searched, in a conventional car navigation program made to start on a personal computer or a car navigation apparatus, for example, as shown in FIG. 2, a line (hereinafter referred to as an emphasis line) for displaying the searched road with emphasis is drawn (overwrite) on the searched road and is displayed. By the emphasis line, the user can easily check the road from the current location to the destination.

However, in this case, the searched road is overwritten with the emphasis line having a drawing width wider than the road width (drawing width) of the road. Thus, the user can not check the mode (color, shape) of the searched road. For example, the user can not recognize whether the road is an expressway or an open road.

Then, there is proposed a method of displaying a searched road with emphasis by drawing an emphasis line of a dotted line as shown in FIG. 3 or by not drawing a line but drawing triangular marks along a searched road as shown in FIG. 4.

In this case, the user can recognize the type of the road from the display of a portion of the road where the emphasis line of the dotted line or the triangular marks are not displayed. However, of course, with respect to the road overwritten with the emphasis line of the dotted line or the triangular marks, the user can not recognize the type of the road. For example, from the display example shown in FIG. 3, the user can not recognize that the road A is an open road in a tunnel. Besides, in the case where the emphasis line of the dotted line or the triangular marks are displayed on a complicatedly bent road, it becomes hard to check the road itself. For example, from the display example shown in FIG. 4, it is hard for the user to recognize which of a road C and a road D has been searched as the route in an area B. Particularly, in the case where a map image is displayed on a monitor with a low resolution, this problem becomes noticeable.

As described above, in a conventional car navigation apparatus or a personal computer on which a conventional car navigation program is made to start, there is a problem that when a searched route (road) is visually emphasized, it becomes hard to recognize the type of the road.

SUMMARY OF THE INVENTION

The present invention has been made in view of such circumstances, and an object thereof is to make it possible to visually emphasize a searched route while preventing such a state that it becomes hard for a user to recognize the type of a road.

According to a first aspect of the invention, an information processing apparatus for drawing a map image corresponding to digitized map information comprises: route search means for searching an objective route based on an input operation of a user; road drawing means for drawing a road of said route searched by said route search means in a mode differentiated by a type of said road; and emphasis line drawing means for drawing emphasis lines at both sides of said road over an overall length of said road drawn by said road drawing means.

According to a second aspect of the invention, an information processing method for drawing a map image corresponding to digitized map information comprises: a route search processing step for searching an objective route based on an input operation of a user; a road drawing processing step for drawing a road of said route searched at said route search processing step in a mode differentiated by a type of said road; and an emphasis line drawing processing step for drawing emphasis lines at both sides of said road over an overall length of said road drawn at said road drawing processing step.

According to a third aspect of the invention, a medium makes an information processing apparatus execute a program for drawing a map image corresponding to digitized map information, and said program comprises: a route search processing step for searching an objective route based on an input operation of a user; a road drawing processing step for drawing a road of said route searched at said route search processing step in a mode differentiated by a type of said road; and an emphasis line drawing processing step for drawing emphasis lines at both sides of said road over an overall length of said road drawn at said road drawing processing step.

In the information processing apparatus of the first aspect, the information processing method of the second aspect, and the medium of the third aspect, when the objective route is searched, the road of the searched route is drawn in a mode differentiated by the type of the road, and the emphasis lines are drawn at both the sides of the drawn road.

DETAILED DESCRIPTION OF THE PREFERRED EMBODIMENTS

Preferred embodiments of the present invention will be described below.

Figure 5:
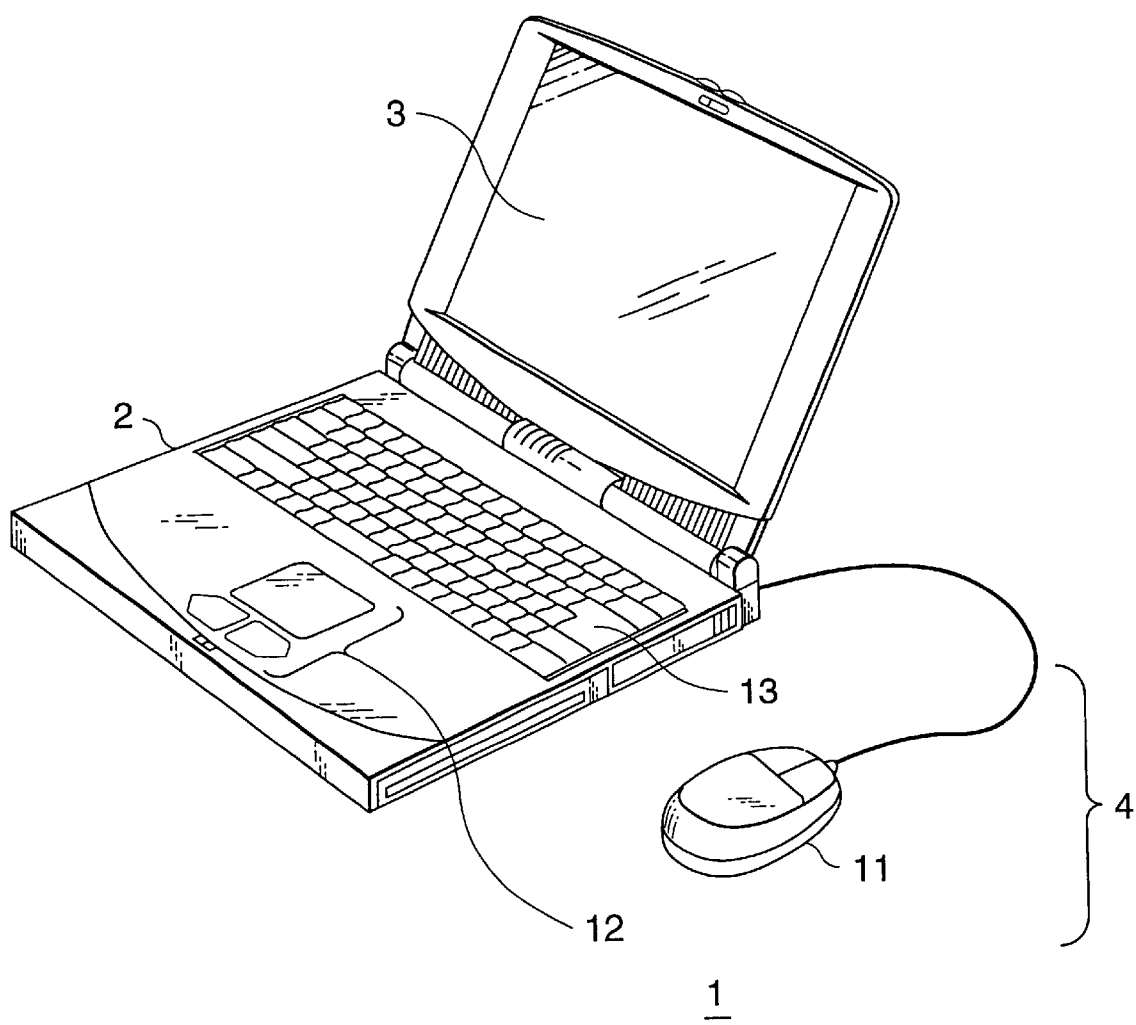
FIG. 5 is a view showing a structural example of an outer appearance of a personal computer 1 to which the present invention is applied.

FIG. 5 shows a structural example of an outer appearance of a personal computer 1 to which the invention is applied.

The personal computer 1 is constituted by a main body 2, a display portion 3, and an input portion 4. The display portion 3 is made of, for example, an LCD (Liquid Crystal Display), and displays various kinds of information such as a pointer and a map image. The input portion 4 is constituted by a mouse 11 operated by a user in the case where information is inputted by moving the pointer displayed on the display portion 3, a touch panel 12, and a keyboard 13 operated by the user in the case where information is inputted from a key.

Figure 6:
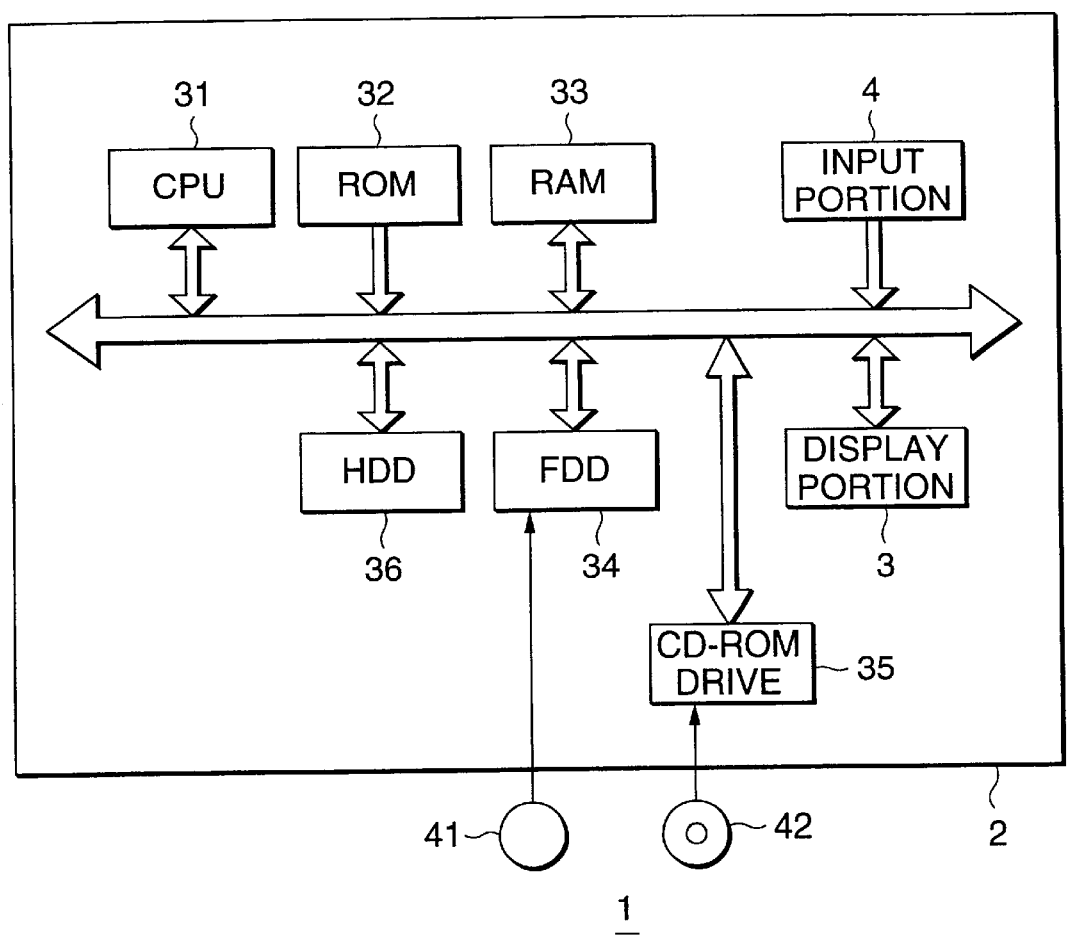
FIG. 6 is a block diagram showing an example of an electrical structure of the personal computer 1 of FIG. 5.

FIG. 6 shows a structural example of the inside of the personal computer 1 of FIG. 5. A CPU (Central Processing Unit) 31 executes various kinds of processing in accordance with programs stored in a ROM (Read Only memory) 32. Further, the CPU reads out map data stored in a floppy disk (hereinafter abbreviated as FD) 41 or a CD-ROM 42 in response to the operation of the user to the input portion 4, and controls the display portion 3, so that an image corresponding to the map data is displayed. Data necessary for the CPU to execute various kinds of processing are suitably stored in a RAM (Random Access Memory) 33.

A floppy disk drive (hereinafter abbreviated as FDD) 34 and a CD-ROM drive 35 record or reproduce data to the FD 41 and the CD-ROM 42, respectively.

A hard disk drive (hereinafter abbreviated as HDD) 36 suitably stores programs, data and the like to be processed by the CPU 31.

In the FD 41 and the CD-ROM 42, a car navigation program is recorded, and further, map data of a navigation service area (for example, the whole of Japan) of the car navigation program are divided into designated blocks (small areas) and are recorded.

Next, with reference to a flowchart of FIG. 7, a processing procedure of the CPU 31 of the personal computer 1 in the case where a searched route (road) is displayed with emphasis, will be described. For example, in the state where the car navigation program supplied from the CD-ROM 42 is made to start, at step S1, when a user operates the input portion 4 to give instructions to search a route from a designated point (for example, current location) to a destination, the CPU 31 searches the route. When the route is specified, at step S2, the CPU 31 controls the CD-ROM drive 35 and reads out, from the CD-ROM 42, map data for one block of a range corresponding to roads of the route searched at step 41, that is, map data for one block of an area in which a map image is displayed on the display portion 3.

Next, at step S3, the CPU 31 causes the RAM 33 to draw the map image corresponding to the map data read out at step S2, and reads out the image from the RAM 33 to cause the display portion 3 to display the image. By this, such a map is displayed that it is possible to recognize whether each road is an open road or an expressway, and so on.

Figure 8:
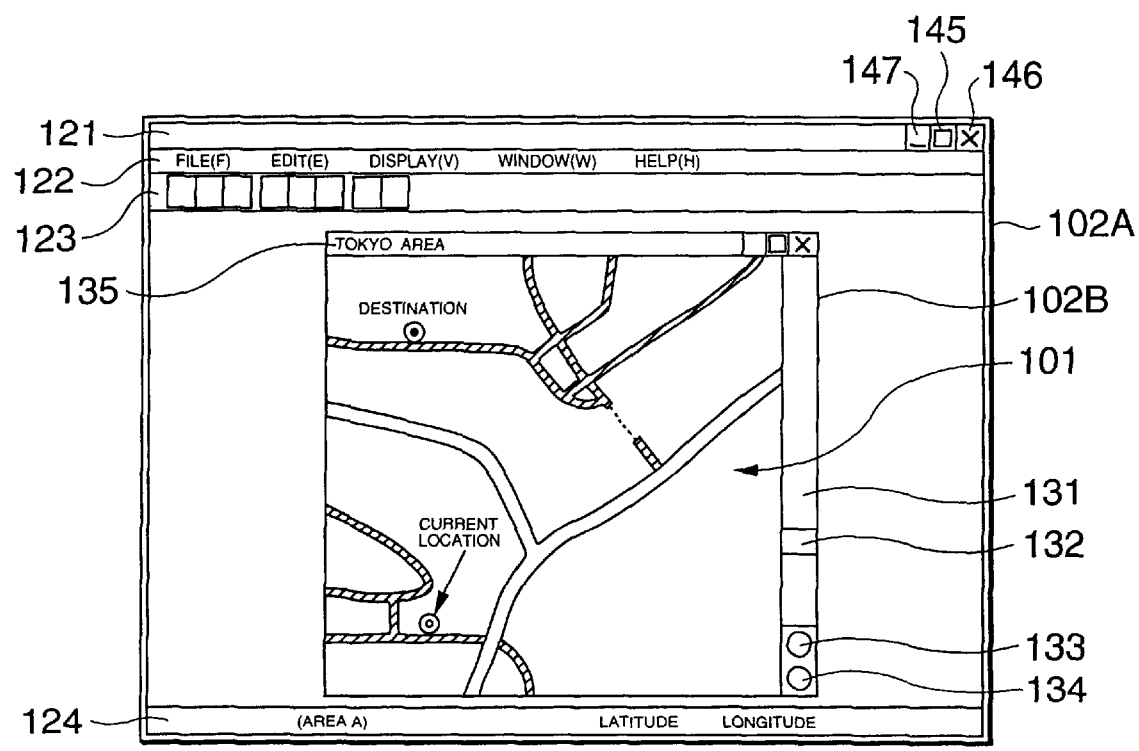
FIG. 8 is a view showing a display example on a display portion 3 of FIG. 5.

Incidentally, since the image data drawn by the RAM 33 are read out from the RAM and are displayed on the display portion 3, this processing will be briefly explained such that the image data are drawn on the display portion 3. At step S4, the CPU 31 judges whether all blocks of the range corresponding to the roads of the route searched at step S1 have been drawn on the display portion 3. In the case where the CPU 31 judges that there remains a block which has not been drawn, the CPU 31 returns to step S2, and the subsequent processing is repeatedly executed. In this way, for example, as shown in FIG. 8, the map image is displayed on an image display portion 101 of a window 102B of the display portion 3.

Figure 1:
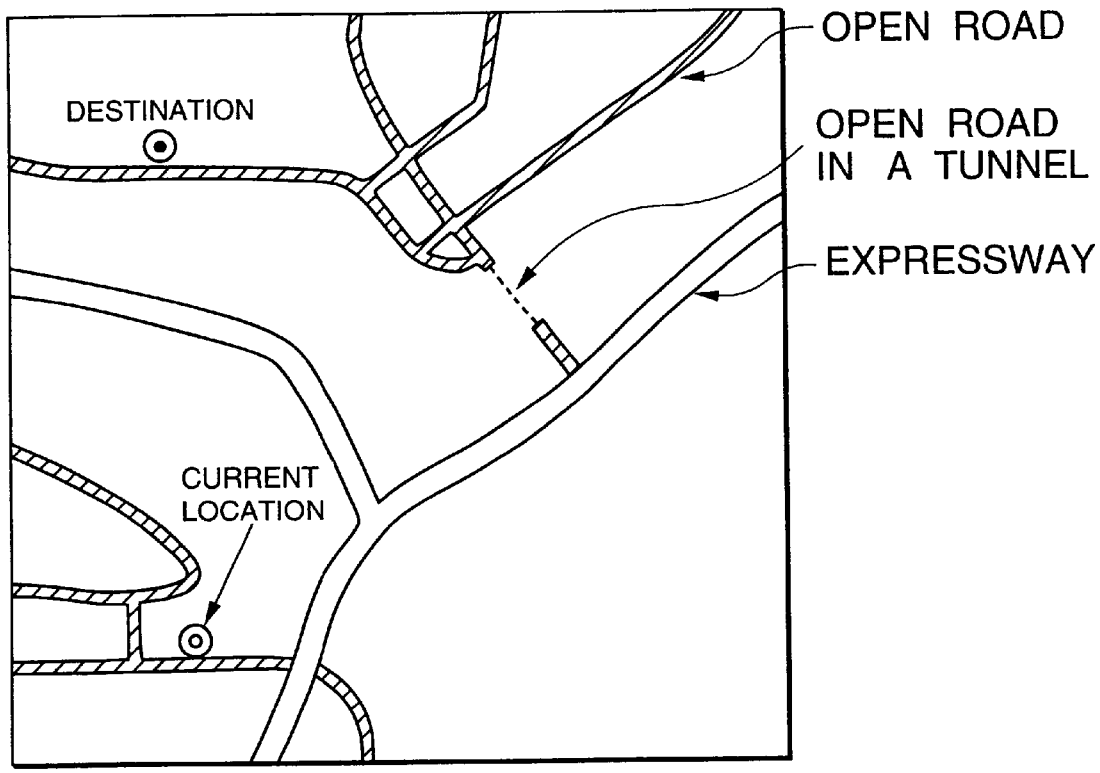
FIG. 1 is a view showing a display example of a conventional map image.
Figure 2:
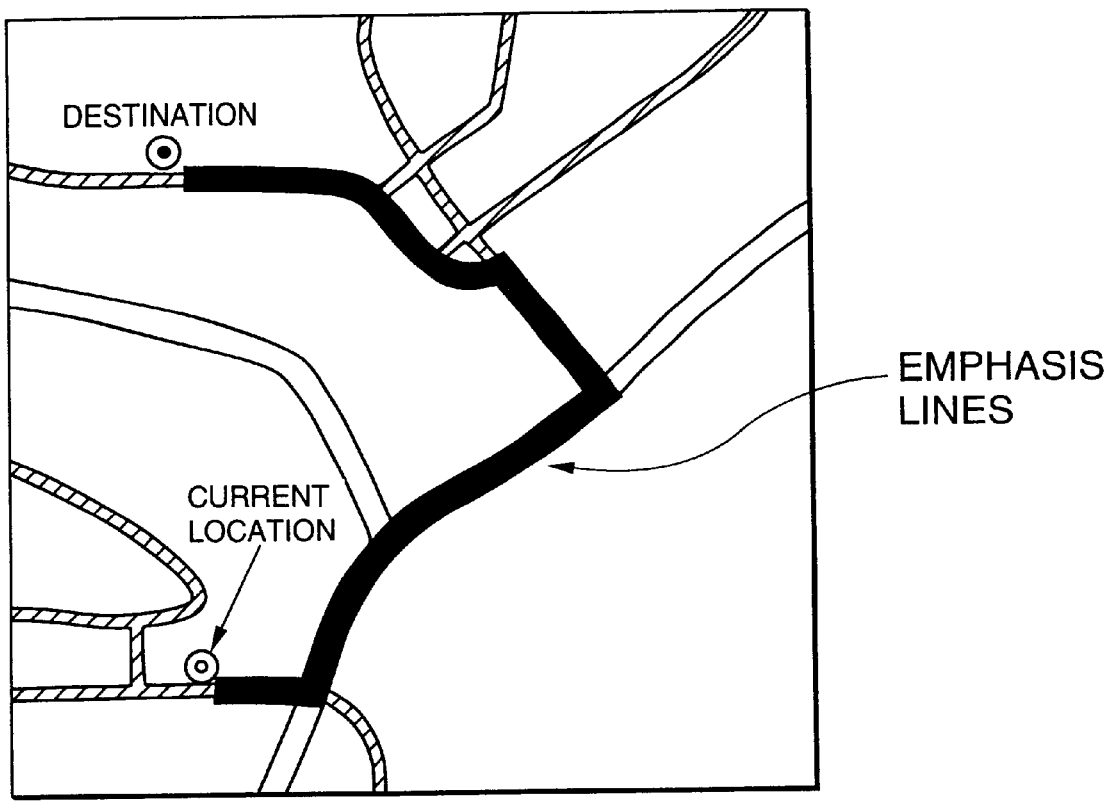
FIG. 2 is a view showing another display example of a conventional map image.
Figure 3:
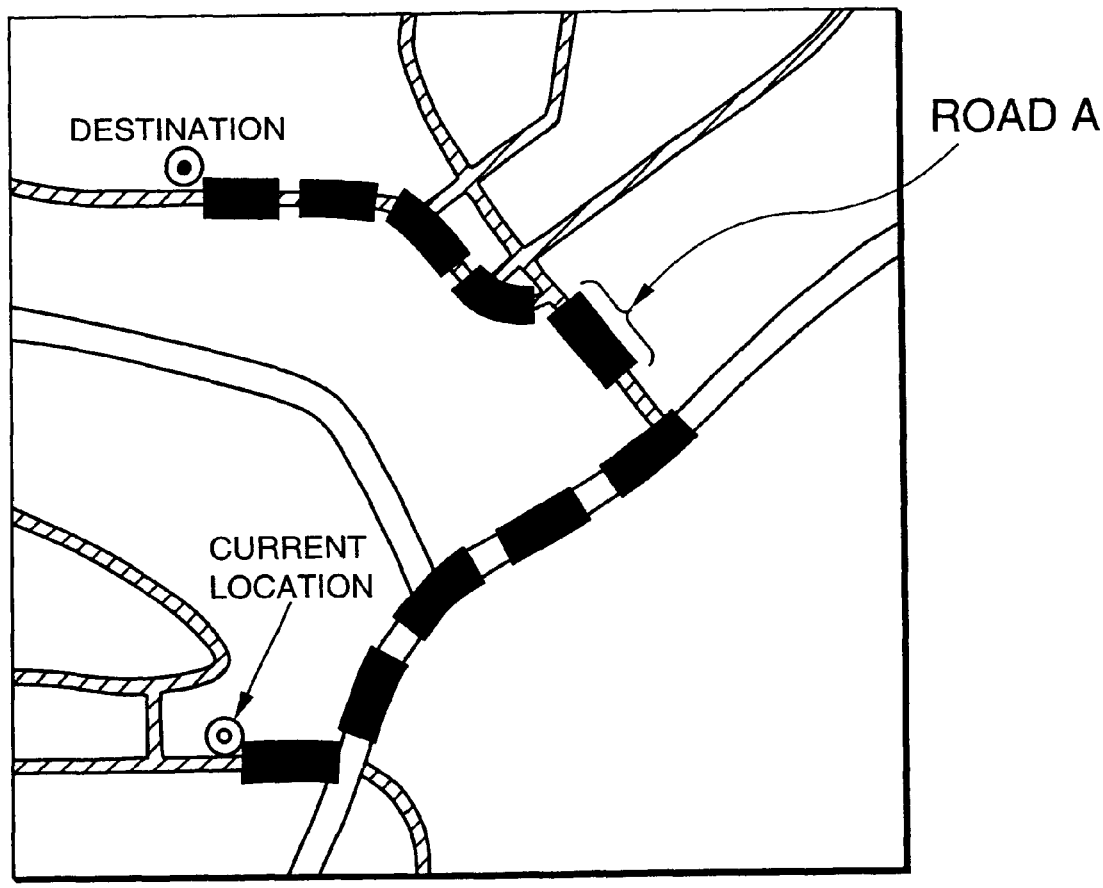
FIG. 3 is a view showing still another display example of a conventional map image.
Figure 4:
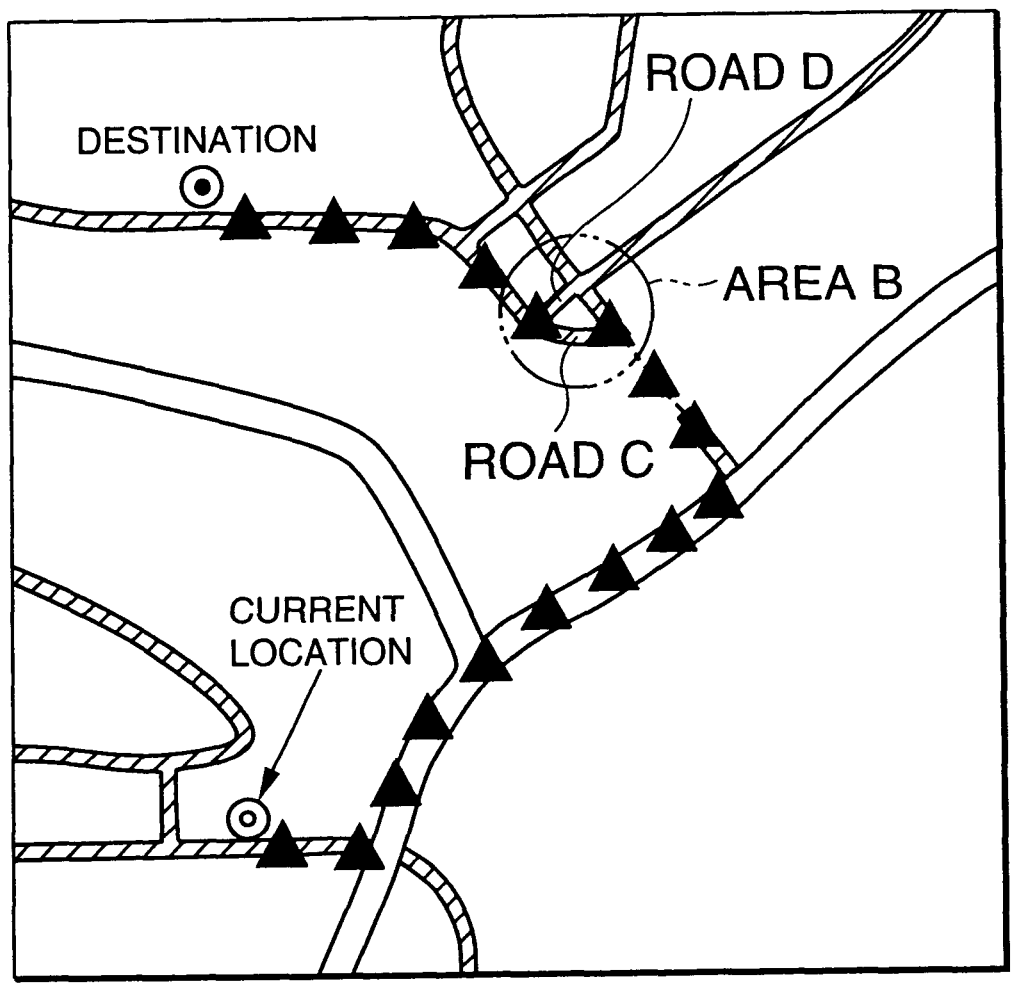
FIG. 4 is a view showing still another display example of a conventional map image.

Similarly to the case of FIG. 1, the current location and destination are displayed on the image display portion 101, and further, various-roads are displayed in designated modes.

In the case of this display example, in addition to the window 102B, a window 102A is displayed on the display portion 3. The window 102A is an application window of WINDOWS 95 (trade mark), and is constituted by a title bar 121 for displaying a name of an application and so on, a menu bar 122 for displaying a pull-down menu, a tool bar 123 for displaying various tools, and a status bar 124 for displaying, in this case, a guidance area, latitude, and longitude.

The window 102B is constituted by a scale bar 131, a scale knob 132, a zoom out button 133, a zoom in button 134, a title display portion 135, and the image display portion 101.

With respect to FIG. 7 again, at step S4, in the case where the CPU 31 judges that all blocks of the range corresponding to the roads of the route searched at step S1 have been drawn on the display portion 3, the CPU proceeds to step S5. At step S5, the CPU 31 controls the CD-ROM drive 35 to read out, from the CD-ROM 42, the width w (drawing width) of the road existing in one block among the roads constituting the route searched at step S1.

At step S6, the CPU 31 calculates the drawing width W (hereinafter referred to as emphasis line width) of emphasis lines from the drawing width w read out at step S5 in accordance with the following equation (1).

$$\text{emphasis line width } W = \text{constant } A \qquad (1)$$

Figure 9:
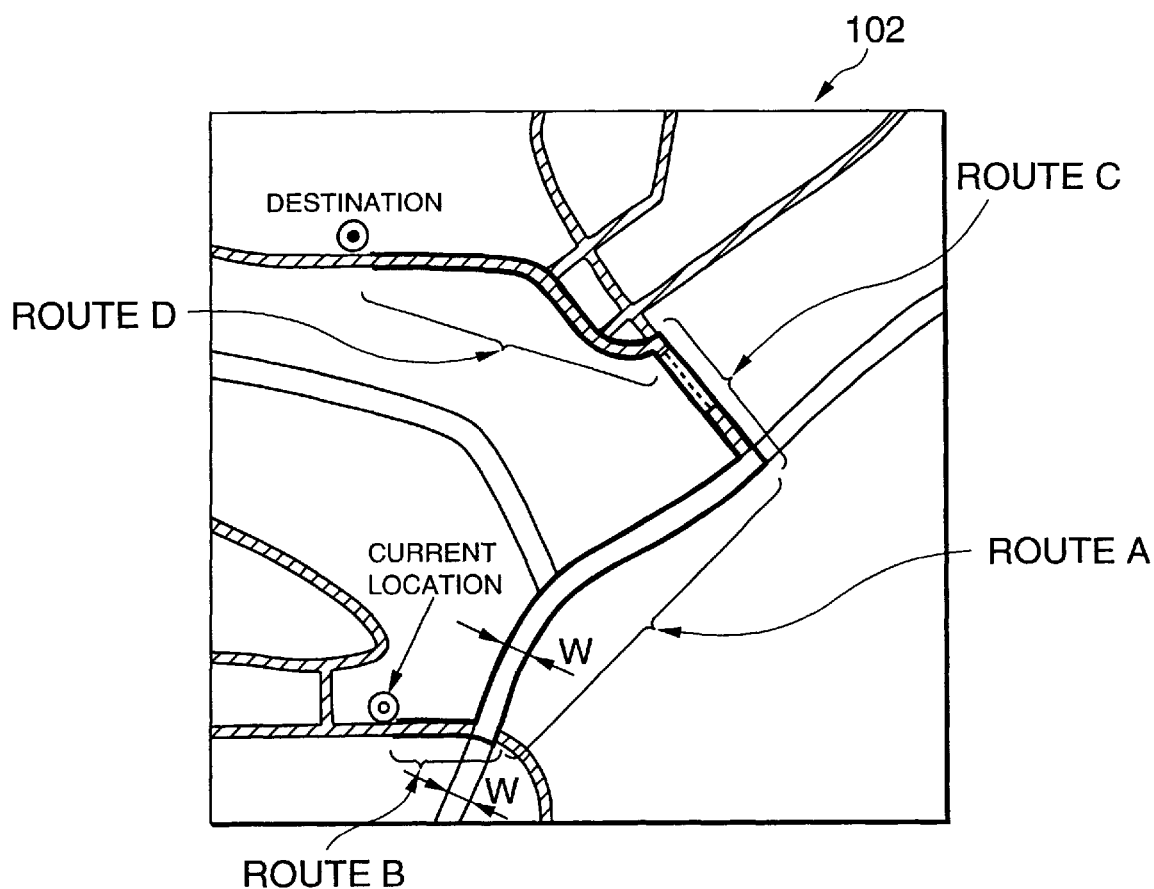
FIG. 9 is a view showing a display example of an image displayed on a window 102B.

However, in this case, the constant A is determined such that the emphasis line width W becomes wider than the drawing width w of the road. Here, the emphasis line width W means, as shown in FIG. 9, an interval between a right emphasis line of the road and a left emphasis line thereof.

Next, at step S7, the CPU 31 causes the emphasis lines, which have the emphasis line width W calculated at step S6 and have a predetermined color, to be drawn (overwrite) on the road which has been searched at step S1 and has been drawn on the display portion 3.

Next, at step S8, the CPU 31 causes the road to be drawn (overwrite), in the original final mode, on the emphasis lines drawn on the display portion 3 at step S7. Since the emphasis line width W is wider than the drawing width w (FIG. 9) of the road, the emphasis lines are displayed at both sides of the road so that the road is visually displayed with emphasis.

At step S9, the CPU 31 judges whether all the roads constituting the route searched at step S1 have been displayed with emphasis. In the case where there remains a road which has not been displayed with emphasis, the CPU returns to step S5, and repeatedly executes the subsequent similar processing. At step S9, in the case where the CPU 31 judges that all the roads of the route searched at step S1 have been displayed with emphasis, the processing is ended.

In this way, as in the display example shown in FIG. 9, the emphasis lines are displayed at both sides of the road searched at step S1, so that the road is visually displayed with emphasis. By this, the user can easily recognize the searched road and can recognizes the type of the road since the original road display (display such as an expressway or an open road) is also made in the inside of the emphasis lines. Besides, even in the case where a complicatedly bent road is searched, the user can easily check that. For example, from the display example shown in FIG. 9, in the route from the current location to the destination, the user can recognize that a route A is an expressway, and other route B, route C, and route D are open roads. Besides, the user can easily recognize that a tunnel exits in the route C.

In the above, at the processing of step S6, the drawing width of the emphasis lines is calculated to become a constant width. However, for example, by using the following equation (2) or equation (3), it is also possible to set the widths of the emphasis lines so that they are wider than the drawing width of each road and become different from each other depending on the sizes of the drawing widths of the roads.

$$\text{emphasis line width } W = \text{constant } B \times \text{drawing width } w \text{ of road} \quad (2)$$

$$\text{emphasis line width } W = \text{constant } C \times \text{drawing width } w \text{ of road} + \text{constant } D \quad (3)$$

Figure 10:
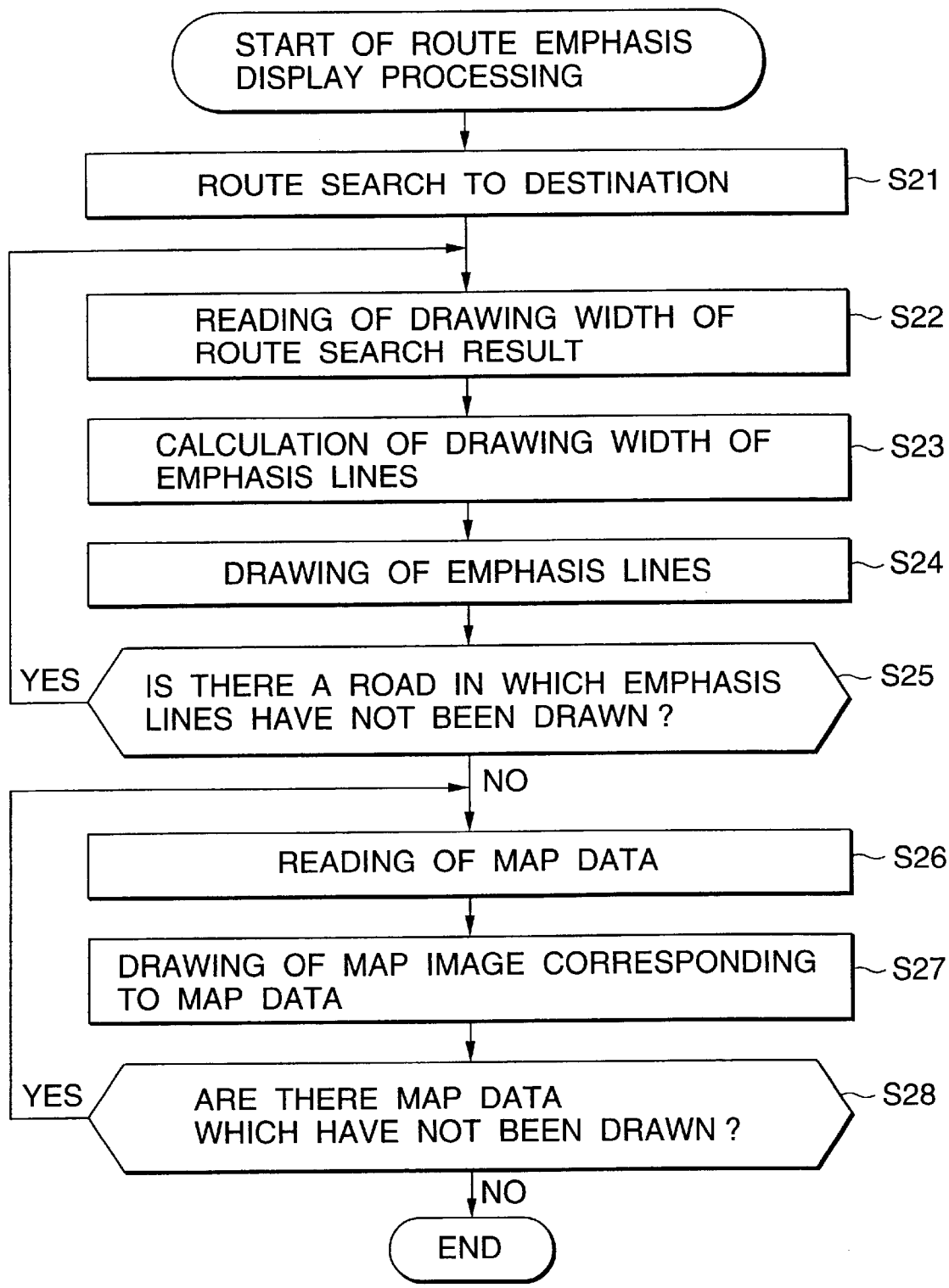
FIG. 10 is a flowchart for explaining another emphasis display processing of a searched route.

Next, another processing procedure of the CPU 31 of the personal computer 1 in the case where the searched route is visually emphasized, will be described with reference to a flowchart of FIG. 10. For example, in the state where the car navigation program supplied from the CD-ROM 42 is made to start, at step S21, when the user operates the input portion 4 and a route from a designated point (for example, current location) to a destination is searched, at step S22, the CPU 31 controls the CD-ROM drive 35 to read out, from the CD-ROM 42, the drawing width of a road existing in one block among the roads of the searched route.

Figure 7:
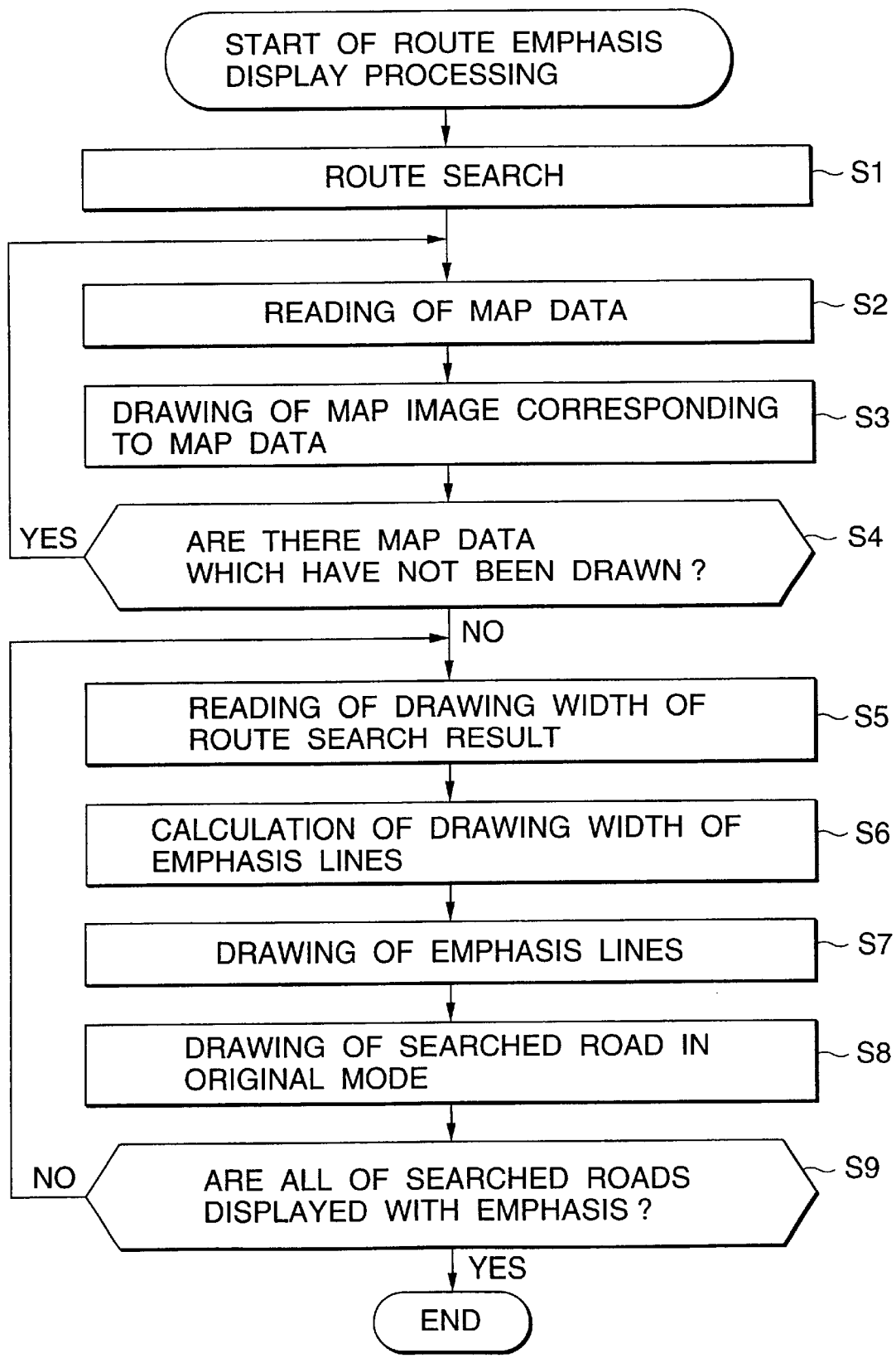
FIG. 7 is a flowchart for explaining an emphasis display processing of a searched route.

Thereafter, at steps S23 and S24, processing similar to the case at steps S6 and S7 of FIG. 7 is executed, so that emphasis lines having a drawing width calculated on the basis of the drawing width of the road of the read out route and having a predetermined color are drawn at the position where the road searched at step S21 is to be drawn. Incidentally, in the processing at step 523, the width of the emphasis lines is calculated in accordance with any one of the foregoing equation (1), equation (2) and equation (3).

At step S25, the CPU judges whether the emphasis lines corresponding to all the roads of the route searched at step S21 have been drawn. In the case where there remains a road in which the corresponding emphasis lines have not been drawn, the CPU returns to step S22, and the subsequent processing is repeatedly executed. At step S25, in the case where the CPU judges that the emphasis lines corresponding to all the roads of the route searched at step S21 have been drawn, the CPU proceeds to step S26.

At steps S26 to S28, processing similar to the case at steps S2 to S4 of FIG. 7 is executed, and a map image of a range corresponding to the roads of the route searched at step S21 is drawn. That is, the roads of the route searched at step S21 are drawn (overwrite) on the emphasis lines drawn on the display portion 3 at step S24. By this, for example, like the display example shown in FIG. 9, a color, pattern and the like to identify an expressway, an open road, and the like are displayed in the inside of the searched road at both sides of which the emphasis lines are displayed.

In the case where there are few polygons, such as buildings, on the map image, the foregoing processing procedure becomes advantageous.

Figure 11:
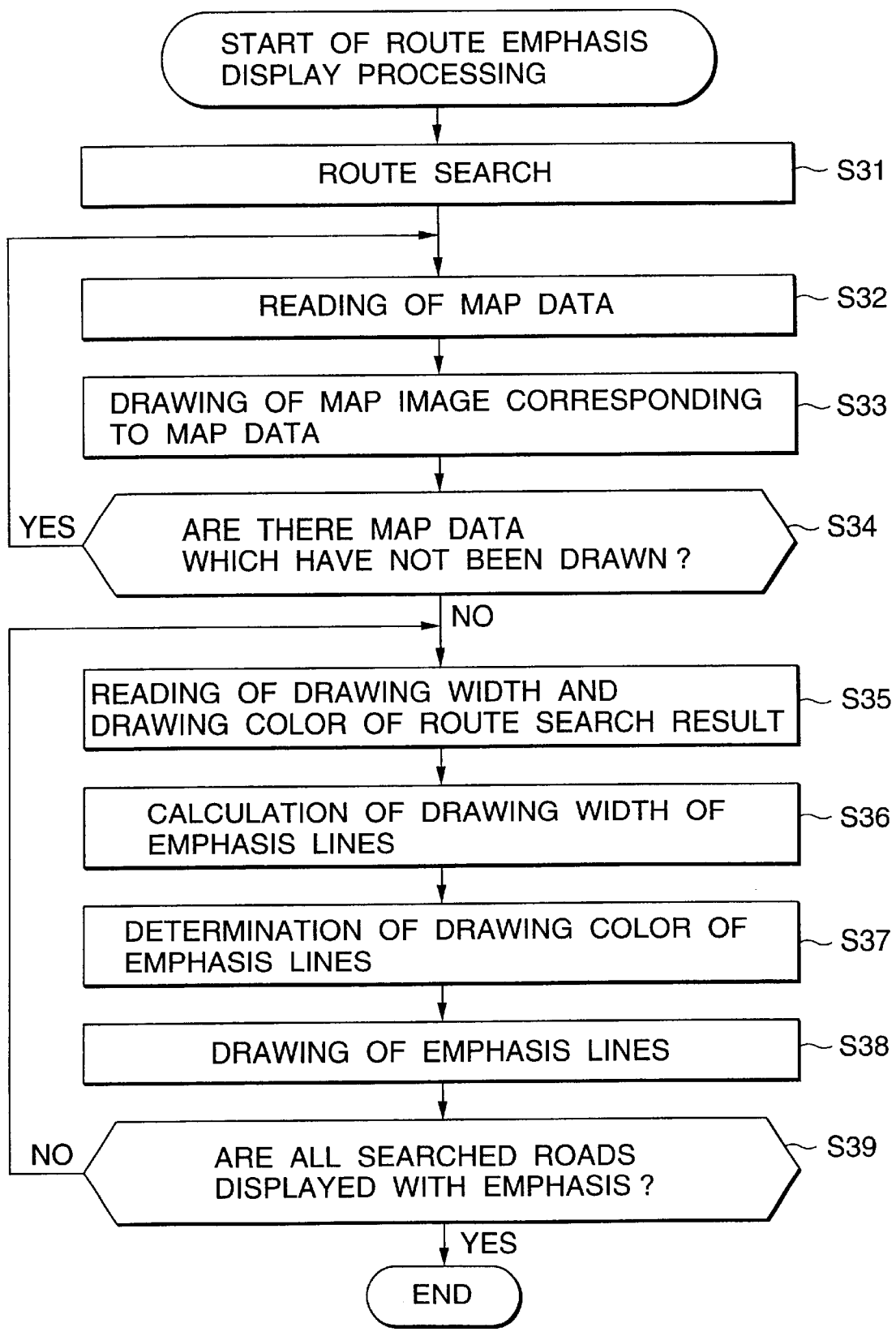
FIG. 11 is a flowchart for explaining still another emphasis display processing of a searched route.

Next, still another processing procedure of the CPU 31 of the personal computer 1 in the case where the searched route is visually emphasized, will be described with reference to a flowchart of FIG. 11.

For example, in the state where the car navigation program supplied from the CD-ROM 42 is made to start, at step S31, when a user operates the input portion 4 and a route from a designated point (for example, current location) to a destination is searched, at step S32, the CPU 31 controls the CD-ROM drive 35 to read out, from the CD-ROM 42, map data of one block of a range corresponding to the roads of the route searched at step 41, that is, map data of one block of an area in which a map image is displayed on the display portion 3.

At steps S33 and S34, processing similar to the case at steps S3 and S4 of FIG. 7 is executed, and the map image of the range corresponding to the roads searched at step S31 is drawn on the display portion 3.

At step S34, in the case where the CPU 31 judges that all blocks of the range corresponding to the searched roads have been drawn on the display portion 3, the CPU 31 proceeds to step S35. At step S35, the CPU 31 controls the CD-ROM drive 35 to read out, from the CD-ROM 42, the drawing width and drawing color of the road existing in one block among the roads of the route searched at step S31. For example, in the case where an expressway is searched, it is read out that the drawing color is white, and in the case where an open road is searched, it is read out that the drawing color is black.

At step S36, the CPU 31 calculates the width of emphasis lines from the drawing width read out at step S35 in accordance with any one of the foregoing equation (1), equation (2), and equation (3).

At step S37, based on the drawing color c read out at step S35, the CPU 31 calculates a drawing color (hereinafter referred to as an emphasis drawing color) C for displaying the road with emphasis by using a designated transformation function f. That is, the operation of the following equation (4) is carried out.

$$C = f(c) \quad (4)$$

The calculated emphasis drawing color is a color close to the original drawing color, that is, such a color that the type of the road can be identified, and is a color which can make visual emphasis, for example, a fluorescent color.

At step S38, the CPU 31 causes the emphasis lines, which have the drawing width calculated at step S36 and have the drawing color calculated at step S37, to be drawn (overwrite) on the road which has been searched at step S31 and has been drawn on the display portion. By this, the road searched at step S31 is displayed with emphasis.

At step S39, the CPU 31 judges whether all the roads searched at step S31 have been displayed with emphasis, and in the case where there remains a road which has not been displayed with emphasis, the CPU 31 returns to step S35, and the subsequent processing is repeatedly executed. At step S39, in the case where the CPU 31 judges that all the roads searched at step S31 have been displayed with emphasis, the processing is ended.

The foregoing processing procedures may be used in combination with each other.

In the above, although the explanation has been made on the case, as an example, where the present invention is applied to a road specified by route search processing, the invention can be applied to roads specified by other methods.

As a providing medium for providing a user with a computer program for executing processing as set forth above, a communication medium such as a network or a satellite can be used in addition to a recording medium such as a magnetic disk, a CD-ROM, and a solid memory.

As described above, according to the information processing apparatus of the first aspect of the invention set forth in the Summary of the Invention section, the information processing method of the second aspect, and the medium of the third aspect, the emphasis lines are drawn at both sides of a road of a searched route over the overall length of the road, so that the road obtained from the route search can be displayed with emphasis while preventing such a state that it becomes hard for a user to recognize the type of the road, for example, an expressway or an open road distinguished in color.

What is claimed is:

1. An information processing apparatus for drawing a map image corresponding to digitized map information, comprising:

route search means for searching an objective route based on an input operation of a user;

road map drawing means for drawing a road map having at least a plurality of roads including a road of said objective route searched by said route search means in a mode differentiated by a road type; and emphasis line drawing means for drawing emphasis lines to indicate said objective route at both outer sides of said road of said objective route throughout an overall length of said objective route, without hiding said road type.

2. An information processing apparatus according to claim 1, further comprising:

read means for reading out drawing information corresponding to said road type drawn by said road map drawing means; and drawing condition calculation means for calculating a drawing condition of said emphasis lines based on said drawing information read out by said read means;

wherein said emphasis line drawing means draws said emphasis lines at both said sides a of said road of said objective route based on said drawing condition calculated by said drawing condition calculating means, throughout said overall length of said objective route.

3. An information processing apparatus according to claim 2, wherein said drawing information is a drawing width of said road.

4. An information processing apparatus according to claim 2, wherein said drawing information is a drawing color of said road.

5. An information processing apparatus according to claim 3, wherein said drawing condition is a drawing width of said emphasis lines.

6. An information processing apparatus according to claim 3, wherein said drawing condition is a drawing color of said emphasis lines.

7. An information processing apparatus according to claim 4, wherein said drawing condition is a drawing width of said emphasis lines.

8. An information processing apparatus according to claim 4, wherein said drawing condition is a drawing color of said emphasis lines.

9. An information processing method for drawing a map image corresponding to digitized map information, comprising:

a route search processing step for searching an objective route based on an input operation of a user;

a road map drawing processing step for drawing a road map having at least a plurality of roads including a road of said objective route searched at said route search processing step in a mode differentiated by a road type; and an emphasis line drawing processing step for drawing emphasis lines to indicate said objective route at both outer sides of said road of said objective route throughout an overall length of said objective route, without biding said road type.

10. An information processing method according to claim 9, further comprising:

a read processing step for reading out drawing information corresponding to said road type drawn at said road map drawing processing step; and a drawing condition calculation processing step for calculating a drawing condition of said emphasis lines based on said drawing information read out at said read processing step;

wherein said emphasis line drawing processing step is for drawing said emphasis lines at both said sides of said road of said objective route based on said drawing condition calculated at said drawing condition calculating processing step, throughout said overall length of said objective route.

11. A medium for making an information processing apparatus execute a program for drawing a map image corresponding to digitized map information, said program comprising:

a route search processing step for searching an objective route based on an input operation of a user;

a road map drawing processing step for drawing a road map having at least a plurality of roads including a road of said objective route searched at said route search processing step in a mode differentiated by a road type; and an emphasis line drawing processing step for drawing emphasis lines to indicate said objective route at both outer sides of said road of said objective route throughout an overall length of said objective route, without hiding said road type.

12. A medium for making an information processing apparatus execute a program according to claim 11, wherein said program further comprises:

a read processing step for reading out drawing information corresponding to said road type drawn at said road map drawing processing step; and a drawing condition calculation processing step for calculating a drawing condition of said emphasis lines based on said drawing information read out at said read processing step;

wherein said emphasis line drawing processing step is for drawing said emphasis lines at both said sides of said road of said objective route based on said drawing condition calculated at said drawing condition calculating processing step, throughout said overall length of said objective route.

* * * * *